O. A. KENYON.
INDICATOR.
APPLICATION FILED FEB. 5, 1915.
1,181,226.
Patented May 2, 1916.
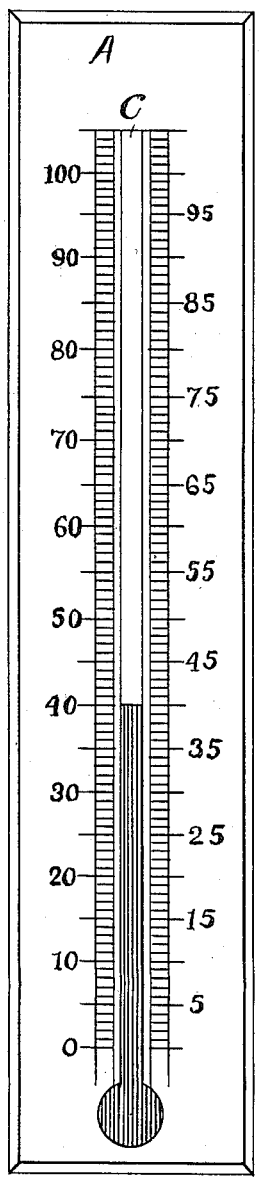
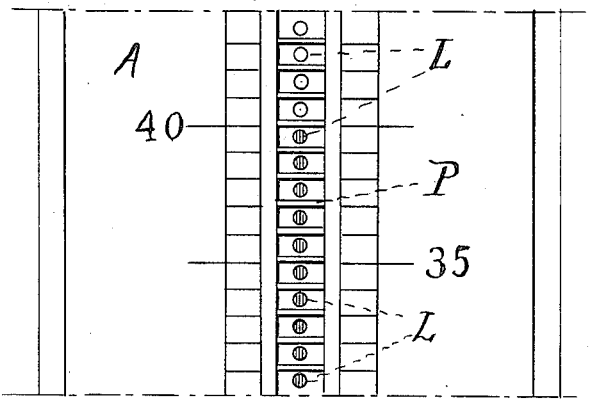
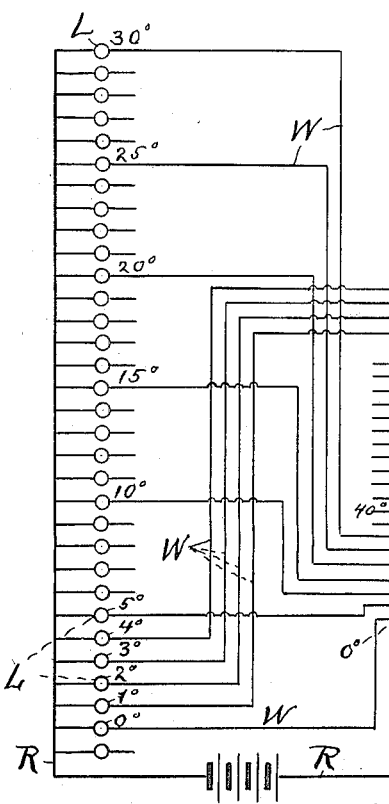
WITNESSES:
Herbert Miller
Chas. P. Fischer
INVENTOR
Otis Allen Kenyon
BY
Edith J. Griswold
ATTORNEY

UNITED STATES PATENT OFFICE.

OTIS ALLEN KENYON, OF HASTINGS-UPON-HUDSON, NEW YORK.

INDICATOR.

1,181,226.  Specification of Letters Patent.  Patented May 2, 1916.

Application filed February 5, 1915. Serial No. 6,267.

*To all whom it may concern:*

Be it known that I, OTIS ALLEN KENYON, a citizen of the United States, residing at River View Manor, Hastings-upon-Hudson, in the county of Westchester and State of New York, have invented new and useful Improvements in Indicators, of which the following is a specification.

This invention relates to indicators, and has for its principal object to transmit the readings of a measuring device, such as a thermometer, barometer, wind-gage, rain-gage, flow-meter, etc., to a distance by means of electricity, and to make the indications by means of light.

I accomplish the purpose of my invention by providing means for indicating the variations in a measuring instrument by light, and arranging a plurality of electric circuits controlled by said measuring instrument, to control, in turn, the said light.

Preferably I use a plurality of electric lamps, the circuits of said lamps being controlled by the measuring instrument. In the majority of cases to which my invention is applicable, measurements are taken by a column of liquid rising or falling, or varying in length, according to variations in nearby conditions, such as the phenomena of the earth's atmosphere, water-pressure, etc., and I have, therefore, shown the application of my invention to a device for indicating the varying length of a column of mercury for measuring temperature.

My invention makes it possible to construct indicating thermometers of enormous size without any sacrifice in accuracy and also without complicating the instrument. Furthermore, my method of transmitting and indicating temperature makes it possible to transmit the indications of a single master instrument simultaneously and continuously to a number of different points at a distance from the master instrument, the temperature and other conditions intervening between the master temperature measuring instrument and the indicator, as well as the conditions surrounding the indicator, having no effect whatever on the indications.

In ordinary thermometers using the expansion of mercury or spirit, there is a very serious limitation as to size, on account of practical difficulties of manufacture, transportation and maintenance. While there may be no limit to the size where accuracy is not taken into account, it is known from experience that a mercury or spirit thermometer of a length much greater than fifteen feet is not practical. Nor is it possible to make a dial form thermometer of large proportions because the mass or weight of the parts involved is so great that friction and wear make accurate indications impossible. Furthermore, a mercury or spirit filled thermometer is limited as to the distance from which it can be read by the width of the mercury or spirit column, and increasing the size of the figures does not make the thermometer more easily read. The bore cannot be unduly increased in diameter because that involves an enormous increase in the volume of the bulb. Moreover, if it were practical greatly to increase the diameter of the bore of such a thermometer, and if this thermometer were of large proportions, it would be difficult to calibrate accurately, because the temperature of the column, as well as that of the bulb, would influence the indications. With my invention none of these difficulties exist, and the principles involved may be utilized to indicate the temperature in a great variety of ways.

By my invention, light may be controlled by a temperature measuring device, such as an ordinary mercury thermometer, to represent a column similar in appearance to a column of mercury or spirit, or it may be controlled to show the thermometric indications in various other ways.

I have shown the preferred form only, but I do not limit myself to this construction.

In the accompanying drawings:—Figure 1 is a face view of an indicator embodying one of the several practical adaptations of the principles of my invention. Fig. 2 represents a portion of Fig. 1, drawn to a larger scale, and with a part removed. Fig. 3 is a diagram for illustrating the electrical connections between the temperature measuring device and the indicator.

Referring to Figs. 1 and 2, A represents a device having the appearance of a mercury or spirit thermometer with a central column C, simulating a column of mercury or spirit. The front of the column C is preferably made of translucent material showing white or some light shade when illuminated from the front, as by daylight or artificial light reflected thereon, but showing red or other deep color, when lighted from behind. In the preferred manner of lighting the column, lamps L are arranged back of the translucent front, the lamps being separated from each other by light-proof partitions P, see Fig. 2, which represents the device with the translucent front removed. Each lamp L here represents one degree of temperature, but it will be evident that the device may be constructed to have each lamp represent more or less than one degree. Figures at the side of the column C indicate the number of degrees.

For convenience, the device thus far described will be referred to as the indicator, while the measuring instrument may consist of any suitable temperature measuring device. The preferred form consists of a bank or series of mercury thermometers having electric contact points sealed into the mercury tubes, whereby, as the mercury rises in the tube it comes in contact with the points successively. The circuit of each lamp L is connected to one of these contact points and to the bulb of the measuring thermometer, so that the mercury closes the lamp circuit when it has expanded to reach the contact point of that lamp, and opens the circuit when it has contracted sufficiently to leave that contact point.

It will be evident that I could use a single measuring fluid column having a contact point at each degree or fraction thereof to be indicated, or I could use a single fluid column for each measurement to be indicated, so that the fluid makes or breaks a circuit at one measuring point only. This last arrangement permits of the greatest accuracy. But I have shown a construction in which each column has several contacts arranged in stepped relation from one column to the next. This master measuring instrument, represented in diagram Fig. 3, consists of a series of thermometers T, T, T, provided with contact points N, each contact controlling a circuit that leads to the lamp L located in that part of the large thermometer scale A which corresponds exactly to the location of the contact in the thermometer T. Each lamp circuit comprises a contact N, a wire W, the lamp L, return conductor R, in which a battery or other source of electricity, E, is included, and the mercury in a thermometer T. As the mercury M rises in the thermometers T, T, T, the circuits of the lamps in the indicator will be closed consecutively, and indicate the temperature step by step. As shown, the lamp L indicating zero temperature is connected by a wire W to the zero registration contact N in the first thermometer T; the lamp indicating one degree of temperature is connected by a wire W to the first degree contact N in the second thermometer T; the lamp indicating two degrees is connected to the second degree contact N of the third thermometer T; the lamp indicating three degrees is connected to the contact N at the third degree of the fourth thermometer T; and the lamp indicating four degrees is connected to the contact N at the fourth degree of the fifth thermometer. Then another series starts with the lamp indicating five degrees being connected to the contact N at the fifth degree of the first thermometer T, and so on. Thus with this arrangement, the contacts N are sealed into the thermometer tubes at five measuring degrees apart, the circuits and contacts N being in stepped relation from one thermometer to the next.

From the foregoing it will be seen that the rising and falling of the mercury M in the thermometers T, T, T, due to changes in temperature, closes and opens the circuits of the lamps L in the indicator A, at the contacts N, in such a way that at all times all the lamps connected to the contacts N at or below the level of the mercury measuring the temperature at the point where the master instrument is located, are lighted, and those above are not lighted, whereby the lighted portion of the column C appears red and the unlighted portion white, thus exactly duplicating the appearance of a column of liquid in a thermometer, except that it rises and falls by definite steps instead of continuously.

The thermometers T, T, T, are represented in the drawings as showing forty degrees of temperature, so that the circuits of all the lamps in the indicator from the forty degree indication down are closed and the lamps lighted, and the indicator A indicates forty degrees of temperature, no matter what the temperature surrounding the indicator may be.

It will be evident that the device may be made to measure and to indicate degrees of temperature far below and far above the zero and 100 marks shown in the drawings. Also that the wires W may be divided and lead to several indicators A located at various points at a distance from the master measuring instrument. Also that this master measuring instrument may be made to measure and the indicator to indicate fractions of degrees of temperature.

Instead of using a double-colored translucent front for the column C it will be readily seen that the lamps themselves may be colored, so that when lighted a colored light will show or will be thrown on a white transparent or translucent column front. For instance, the lamps may be red, and as shown in Fig. 2, those at and below the figure 40 are illustrated as lighted and showing red.

From the foregoing it will readily be seen that my indicator may be applied to other measuring instruments that may be adapted to control a plurality of electric circuits.

I claim as my invention:—

1. A temperature indicator comprising a column simulating a thermometer, a plurality of electric lamps arranged to change the appearance of the portion of said column which is intended to simulate the liquid of the column, a scale along the column to indicate degrees of temperature, and a measuring instrument adapted to control the lighting of said lamps to vary the length of the portion of the column illuminated in exact correspondence with the varying temperature measured by said instrument.

2. A temperature indicator comprising a column adapted to show one color when illuminated from the rear and another color when illuminated from the front only, and indications along the column to indicate degrees of temperature, in combination with a temperature measuring instrument adapted to control the lighting of the said column from the rear and to vary the distance lighted in exact correspondence with the varying temperature measured by said instrument.

3. A temperature indicator comprising a series of electric circuits and means controlled thereby to indicate different degrees of temperature, in combination with a temperature measuring instrument comprising a series of mercury thermometers provided with contacts in the mercury tubes, consecutive indication circuits being controlled by different thermometers of the series.

4. An indicator comprising a plurality of electric lamps arranged to indicate varying measurements, in combination with a measuring instrument consisting of a series of fluid columns having contacts controlled by the fluid therein, the circuits of consecutive lamps being controlled by contacts in different columns.

In testimony whereof I have signed my name to this specification in the presence of two subscribing witnesses.

OTIS ALLEN KENYON.

Witnesses:
CHAS. S. FISCHER,
HERBERT MILKER.